March 21, 1961 R. L. COFFEY ET AL 2,975,774
INTERNAL COMBUSTION ENGINES
Filed April 21, 1959 3 Sheets-Sheet 1

INVENTORS
ROBERT L. COFFEY
RUFUS J. BUCHANAN,
BY
Linton and Linton
ATTORNEYS.

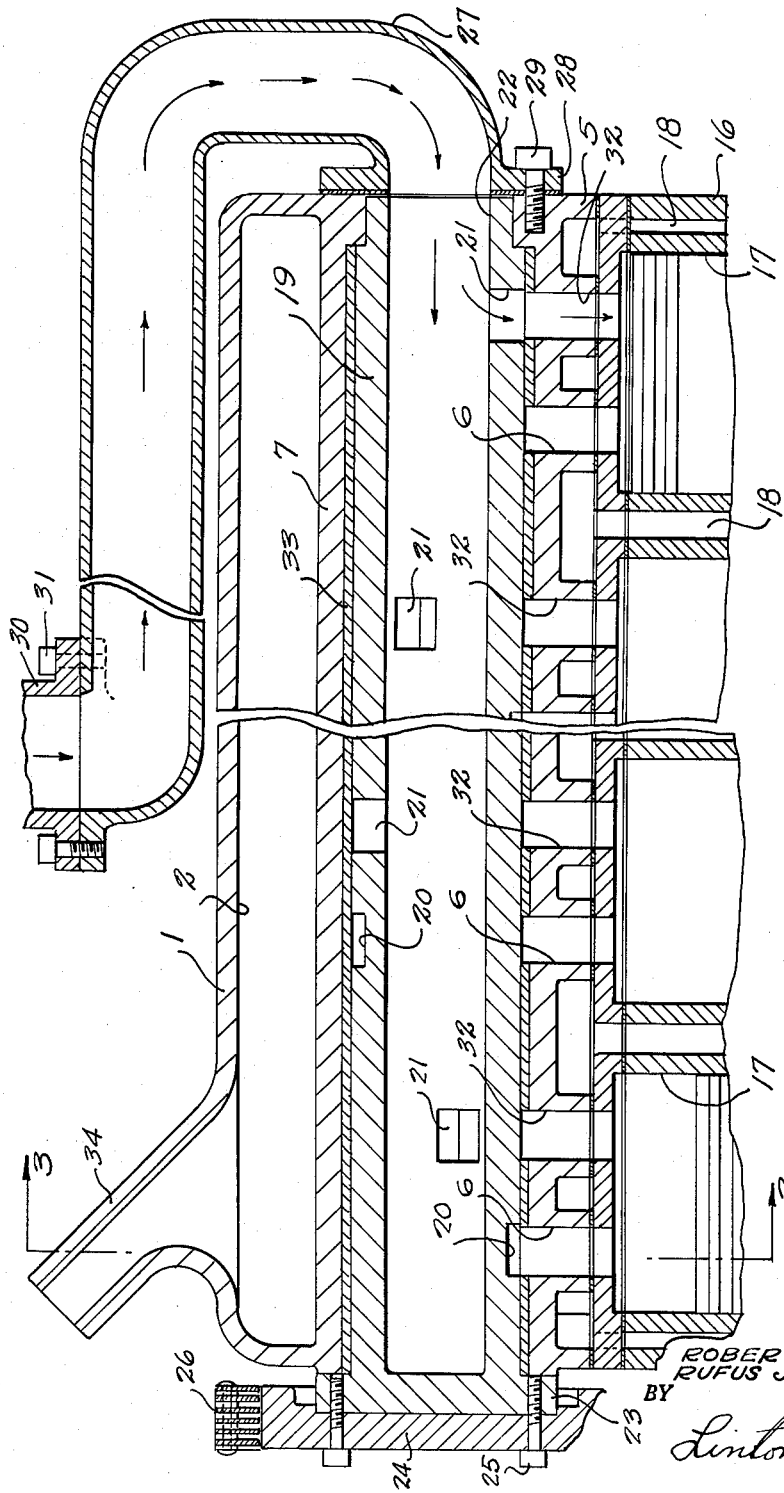

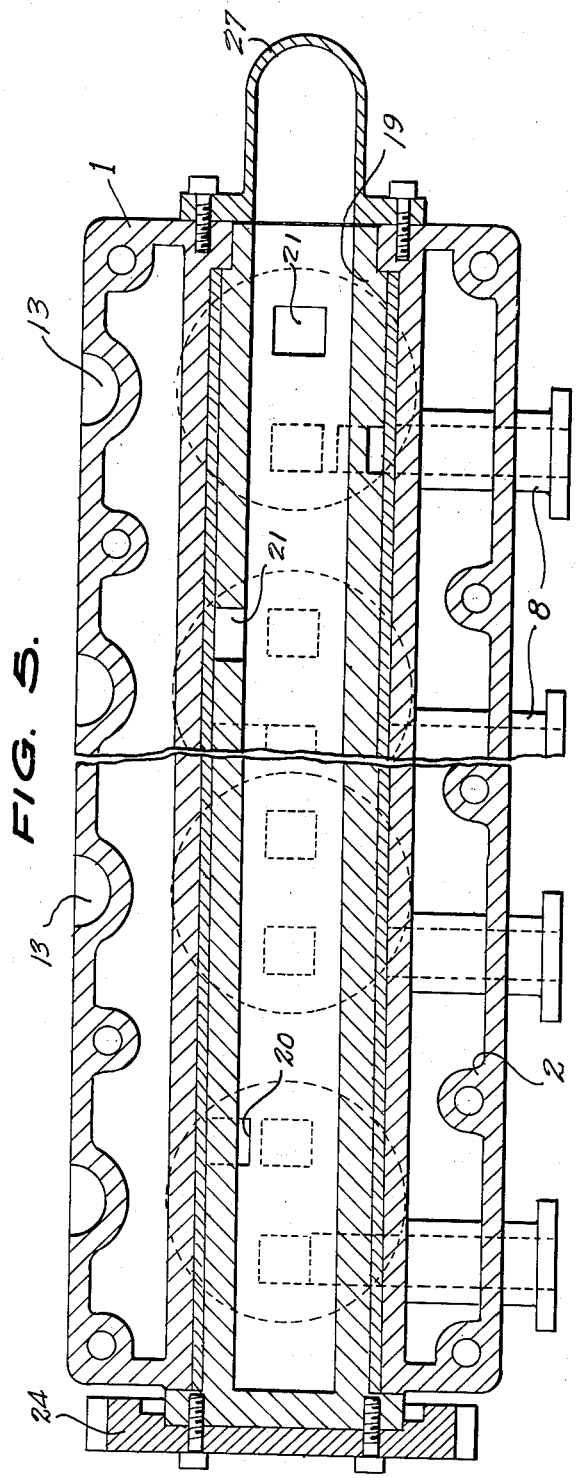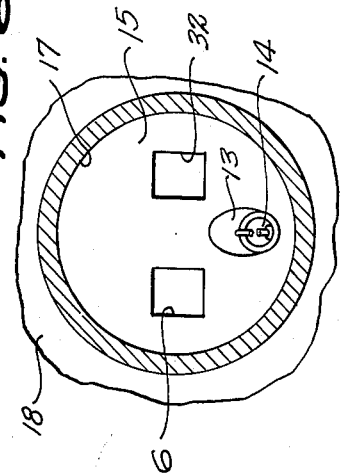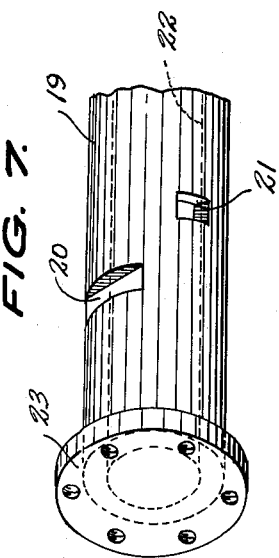

United States Patent Office 2,975,774
Patented Mar. 21, 1961

2,975,774
INTERNAL COMBUSTION ENGINES
Robert L. Coffey, 4002 St. Elmo, Chattanooga, Tenn., and Rufus J. Buchanan, Rte. 2, Kensington, Ga.
Filed Apr. 21, 1959, Ser. No. 807,930
1 Claim. (Cl. 123—59)

The present invention is related to internal combustion engines and is more particularly concerned with an improvement for such engines.

The principal object of the invention is to provide an internal combusion engine having a minimum number of parts particularly with relationship to the fuel intake and combusion exhaust thereof and simplification of engine construction rendering the same more economical to provide and maintain.

Another and important object of the invention is to provide a novel and improved form of cylinder head which provides for the admission of fuel and the exhausting of combustion gases in direct connection with each of the engine cylinders eliminating valves, rocker arms, camshafts, springs, lifters and the like as used by gasoline burning engines as presently in general use.

A still further important object is to provide a novel cylinder head for internal combustion engines having open top cylinder blocks and which cylinder head has a rotary element for both admitting fuel to each of the engine cylinders and exhausting the combustion gases therefrom in their proper sequence for the operation of the engine.

It is a further object of the invention to provide an economically produceable valved cylinder head having a structure that provides for the complete and proper cooling of all parts subjected to the heat of combustion and exhaust gases from the engine cylinders.

Further objects will be in part obvious and in part pointed out in the following detailed description of the accompanying drawings wherein:

Fig. 2 is a longitudinal section taken on line 2—2 of Fig. 1.

Fig. 5 is a longitudinal sectional view taken on line 5—5 of Fig. 3.

Fig. 6 is a sectional view of a portion of the cylinder head above one engine cylinder as taken on line 6—6 of Fig. 3.

Figure 3:
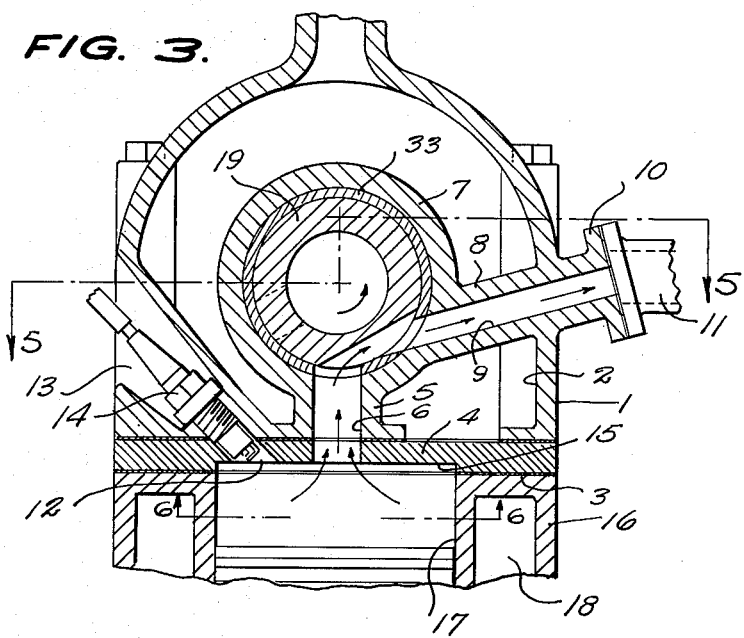
Fig. 3 is a cross-sectional view taken on line 3—3 of Fig. 2.

And Fig. 7 is a persective view of the drive end portion of a rotary valve forming part of the present cylinder head.

Referring now more particularly to the accompanying drawing wherein like and corresponding parts are designated by similar reference characters, numeral 1 designates a hollow cylinder head having an interior cavity 2 and a flat bottom face 3. Within cavity 2 there is a flat bottom 4 from which extends a standard 5 which continues lengthwise of said head. Said standard has a series of openings 6 therethrough and a tubular housing 7 mounted on the top of said standard. A series of exhaust tubes 8 extend laterally from said housing through head 1. Each exhaust tube has a bore 9 and an end flange 10 for connecting the same to an exhaust 11.

Head 1 also has a series of threaded tubular sections 13 extending from the exterior of said head and each having an opening 12 whereby spark plug 14 enclosed therein has its electrodes communicating with the annular raise 15 of which there is a series in bottom face 3 of said head. An open top cylinder block 16 having a series of cylinders 17 therein also has coolant passages 18 surrounding said cylinders. Flat face 3 of head 1 is mounted on the top of said cylinder block with each of the recesses 15 positioned on a cylinder 17 forming the top of the combustion chamber therefor.

Tubular housing 7 has a cylindrical valve 19 rotatably mounted therein which valve has a series of tangential recesses 20 provided in the peripheral surface of said valve. The valve also has a series of lateral openings 21 provided therethrough as well as a longitudinal bore 22.

Said valve further has a flange-crossed end 23 to which is fastened a gear 24 by a plurality of bolts 25. A chain 26 extends around said gear and connects the same to the engine crankshaft not shown.

A J-shaped tube 27 having a flanged end 28 is attached to head 1 by a series of bolts 29 with the interior of said tube being in communication with the open end of valve 19. The opposite end of said valve supports a carburetor 30 which is connected thereto by bolts 31.

Standard 5 has a further series of openings 32 therethrough with the openings 6 and 32 comprising the exhaust end fuel inlet openings respectively. Thus each cylinder 17 has an opening 6 and an opening 32 communicating with its respective recess 15 with the opening 32 for emitting fuel to the cylinder and the opening 6 for exhausting the combusting gases from the cylinder. Said openings 6 and 32 are also in communication with the bore 22 of valve 19. Each of said valve peripheral recesses 20 are positioned on said valve for at times extending in line with one of said openings 6 and a corresponding exhaust tube 8, as shown in Fig. 3, for exhausting the gases from the cylinder 17 through the opening 6, recess 20 and exhaust tube 8.

Figure 4:
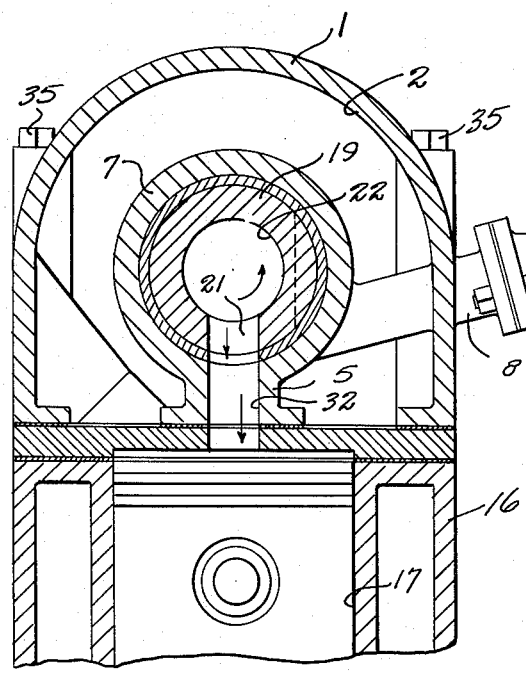
Fig. 4 is a cross-sectional view taken on line 4—4 of Fig. 2.
Figure 1:
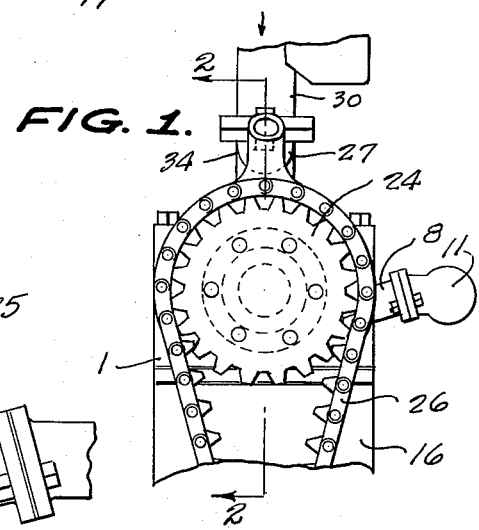
Fig. 1 is an end view of the cylinder head portion of an engine incorporating the present invention.

Each of the valve openings 21 are positioned for at times extending in line with one of the fuel inlet openings 32 as shown in Fig. 4, whereby fuel from carburetor 30 will press through tube 27 into valve bore 22 and through the opening 21 in line with its corresponding standard opening 32.

Chain 26 upon being driven by the engine crankshaft rotates valve 19 through gear 24 and accordingly the recesses 20 and the openings 21 are each further positioned for communicating with their respective openings 6 or 32 at the proper time for the emission of fuel or exhausting of gases, in accordance with the movement of the pistons within their respective cylinders. To assist in the rotation of valve 19, a sleeve 33 of a suitable bearing material surrounds said valve except for openings above the openings 6 and 32 of said standard.

A pipe 34 is mounted upon the top of said head 1 for being connected to the cooling system for the engine whereby a coolant can be admitted through pipe 34 and the cavity 2 and thus surround housing 7, each of the exhaust tubes 8, standard 5 and a spark plug cavity 13, as well as engaging the bottom 4 for assuming the cooling of these members during the operation of the engine.

Said head 1 is retained upon the cylinder block 16 by a plurality of head bolts 35 extending through suitable openings in said head and being in related engagement with said block.

The present engine is started in any conventional manner by rotating the crankshaft, which through chain 26 rotates the valve 19 for emitting fuel from carburetor 30 to one of the cylinders as indicated in Fig. 2. Spark plug 14 for that particular cylinder is caused to ignite the fuel after the opening 21 has passed the opening 32. A recess 20 also as indicated in Fig. 2, can at the same time or soon thereafter exhaust the gases from the cylinder in which combustion has previously taken place to prepare the cylinder for a fresh supply of fuel. Thus continued rotation of the valve brings the fuel emitting openings 21 to the proper cylinder at the proper time and also an exhaust opening to the cylinder to be exhausted in the proper sequence, whereupon continued operation of the engine will be effected.

The present invention is capable of considerable modification and such changes thereto as come within the scope of the appended claim is deemed to be a part of the invention.

We claim:

A cylinder head wth fuel and exhaust control means for internal combustion engine open top cylinder blocks comprising a flat plate to be mounted on and closing said cylinder block open top and having an intake and an exhaust opening for each cylinder of said block, a hollow elongated head having a flat open bottom detachably mounted on said plate and detachably connected to said block retaining said plate thereon, said head being capable of extending lengthwise of the cylinder block and having opposite ends each with an opening therethrough, an open ended tube extending lengthwise of the interior of said head with each open end of said tube connected to one of said ends of said head for being positioned lengthwise of said block, a plurality of exhaust tubes extending laterally from said tube through said head connecting the bore of said tube with the exterior of said head, a standard connected to and extending lengthwise of said tube and said head and laterally from said tube through said head open bottom for being mounted on said plate in line with said plate intake and exhaust openings, a longitudinal series of passages in said standard for connecting the bore of said tube with said plate intake and exhaust opening, an elongated one-piece cylindrical member extending longitudinally the entire length of said tube bore and through said head end openings with its base exteriorly of one end of said head and its open end opening at the opposite end of said head, means connected to said cylindrical member base for rotating said cylindrical member in said tube, said cylindrical member having a series of tangential recesses in the periphery thereof each in line with an opening in said standard communicating with an exhaust opening in said plate and also in line with one of said exhaust tubes for at times placing the same in communication with said standard opening, said cylindrical member also having a series of lateral openings through the side wall of said member each positioned for at times placing the bore of said cylindrical member in communication with one of said standard openings in line with an intake opening in said plate, a tube having one end connected to the exterior of said head opposite end having said cylindrical member opening therethrough with the bore of said tube communicating with the bore of said cylindrical member and its opposite end connected to a source of fuel and a source of cooling fluid connected to and through said head.

References Cited in the file of this patent
UNITED STATES PATENTS

| | | |
|---|---|---|
| 1,098,574 | Hopkes | June 2, 1914 |
| 1,144,921 | Stever | June 29, 1915 |
| 1,148,288 | Crossley | July 27, 1915 |
| 1,188,656 | Hoff | June 27, 1916 |
| 1,230,161 | Herron | June 19, 1917 |
| 1,557,245 | Frazier | Oct. 13, 1925 |
| 1,619,226 | Werbitzky | Mar. 1, 1927 |
| 1,854,648 | Foss | Apr. 19, 1932 |